United States Patent [19]
Rice

[11] Patent Number: 5,846,316
[45] Date of Patent: Dec. 8, 1998

[54] SHRINKAGE-COMPENSATING CONCRETE

[76] Inventor: Edward K. Rice, 2077 Linda Flora Dr., Los Angeles, Calif. 90077

[21] Appl. No.: 713,955

[22] Filed: Sep. 12, 1996

[51] Int. Cl.⁶ .............................. C04B 7/38; C04B 11/28; C04B 11/30; C04B 7/04
[52] U.S. Cl. ......................... 106/735; 106/772; 106/788; 106/819; 106/820; 106/713
[58] Field of Search .................................. 106/735, 772, 106/775, 788, 819, 820, 713

[56] References Cited

U.S. PATENT DOCUMENTS

| | | | |
|---|---|---|---|
| 3,155,526 | 11/1964 | Klein | 106/820 |
| 3,251,701 | 5/1966 | Klein | 106/820 |
| 3,857,714 | 12/1974 | Mehta | 106/820 |
| 4,419,136 | 12/1983 | Rice | 106/735 |
| 4,452,637 | 6/1984 | Suzukawa et al. | 106/820 |

*Primary Examiner*—Michael Marcheschi
*Attorney, Agent, or Firm*—Lyon & Lyon LLP

[57] ABSTRACT

A shrinkage compensating cement exceeding the ASTM standard specification limiting 28 day expansion to 115% of the 7 day expansion. 28 day expansions of 120–200% are contemplated. The expansion takes place over an extended period of time, to better offset the shrinkage occurring as the concrete dries. The development of tensile stresses in the concrete is reduced and also is delayed, allowing more time for the tensile strength of the concrete to increase as the concrete dries. Shrinkage cracking is consequently significantly reduced.

28 Claims, No Drawings

SHRINKAGE-COMPENSATING CONCRETE

BACKGROUND OF THE INVENTION

Drying shrinkage is the most common cause of cracking in concrete floors, columns and other concrete members. As conventional concrete dries, it shrinks. When restrained, the shrinkage creates tensile stresses in the concrete. Concretes generally have low tensile strength. Therefore even relatively low shrinkage induced tensile stresses often cause cracking.

The use of expansive cements to compensate for drying shrinkage in an effort to avoid cracking is well known. See, for example, Klein, U.S. Pat. No. 3,251,701. My U.S. Pat. No. 4,419,136 also describes an expansive cement controlled by particle sizes of the ground expansive cement clinker. The principle used in expansive cements is to provide an expansive agent to expand the concrete to compensate for the drying shrinkage.

Shrinkage compensating concrete (SCC) is defined in ASTM C 845–90 as a concrete made with an expansive cement in which the expansion, if restrained, induces compressive stresses that approximately offset tensile stresses induced by drying shrinkage. Shrinkage compensating concrete is also defined as a concrete which when properly restrained by reinforcement or other means will expand an amount equal to or slightly greater than the anticipated drying shrinkage (American Concrete Institute (ACI) Standard Practice ACI 223–93).

After the concrete has expanded, subsequent drying shrinkage will reduce these expansive stresses or strains but, ideally, a residual compression will remain in the concrete for extended periods of time, thereby eliminating shrinkage cracking. While ordinarily drying shrinkage cracking generally does not directly affect structural integrity, it is still undesirable. In certain applications, such as floors in industrial buildings, shrinkage cracks must be (e.g., with epoxy fillers) especially in food processing or pharmaceutical manufacturing buildings. These repairs may be costly and time consuming, especially when the cracks run underneath machinery, warehouse racks and other fixtures which are not easily moved. Moreover, such cracking degrades the appearance of the floor. Shrinkage cracking can also expose internal reinforcing steel of outdoor structures to the corrosive environment of water, salt, etc., leading to structural defects over time.

The standard specification for expansive cements is ASTM C 845–90 which limits the seven day expansion to a range of 0.04 to 0.1%. The expansion is measured by restrained mortar bars in accordance with ASTM C 806. The ASTM C845–90 specification also limits the 28 day expansion to 115% of the 7 day expansion. Using cements which meet the requirements of ASTM C 845, ACI in its Standard Practice for Use of Shrinkage-Compensating Concrete ACI 223–93, sets forth the criteria and practices necessary to insure that expansion occurs at the time and in the amount required. These criteria set certain minimum amounts of reinforcement and allowance for expansion of the concrete. Most SCC made with cements meeting the requirements of ASTM C845 go into tension in less then one year and some concrete cracking still take place. However, the ASTM standard limits expansion because it is thought that too much expansion of restrained or unrestrained concrete will cause disruptive forces in the concrete and the strength will be materially reduced. Thus, while achieving crack-free concrete has remained an elusive goal, the conventional thinking in concrete technology has been to limit the expansion of expansive cements, to those described in the ASTM standard. Accordingly, it is an object of the invention to provide an improved shrinkage compensating concrete.

SUMMARY OF THE INVENTION

To these ends, in a first form of my invention, a shrinkage-compensated concrete is made with an expansive cement having a 7-day expansion of from about 0.04% to 0.10%, and a 28 day expansion of about 120–200% of the 7-day expansion. In this first form of my invention, the cement preferably is from about 8–22% expansive component with the balance being Portland cement. The expansive component is a mixture of expansive clinker containing about 20–60% $C_4A_3S$ and gypsum in the proportion of about 45% expansive clinker and 55% gypsum.

In a second form of my invention, a shrinkage-compensated concrete is made with an expansive cement having a 7-day expansion of less than 0.04%, preferably about 0.02%–0.04%, and a 28 day expansion of about 120–200% of the 7-day expansion. In this second form of my invention, the cement is preferably from about 2–9% of expansive component (when the expansive clinker contains about 20–60% $C_4A_3\bar{S}$) with the balance being Portland cement. While these designs exceed the industry standards and conventional concrete designs, there is no detrimental effect on the strength.

By changing the expansion criteria, I have developed a concrete which stays in compression for longer periods of time (and thereby avoids or reduces cracking). The period of time during which the concrete stays in compression advantageously exceeds the time frame in which most of the drying shrinkage takes place. By exceeding the limitations consistently used in the concrete industry of (ASTM C845 limiting the 28 day expansion to 115% of the seven day expansion) my new concrete stays in compression for a longer period of time allowing more shrinkage to occur, with fewer cracks.

Curing is preferably extended to 14 days, i.e., damp or wet curing for 14 days, instead of 7 days, which delays the onset of air drying. During this delay, the tensile strength of the concrete is increasing, so that if and when subsequent shrinkage occurs, the concrete is better able to withstand the accompanying tensile stresses. When the concrete (Test Bar ASTM 878) shrinks to less than its original length, the in place concrete correspondingly goes into tension and cracks can occur, at some proportionally later time. Concrete gains tensile strength over time. The longer the time from casting to the concrete reaching zero compression (or its original length), the greater the tensile strength in the concrete and the greater the resistance to cracking. While expansive cements are more costly than ordinary portland cements, due to higher raw material cost, in many applications, the benefits realized far exceed the higher cost.

In a third form of my invention, methods for preparing SCC are described.

DETAILED DESCRIPTION OF THE PREFERRED EMBODIMENTS

My new concrete is prepared as follows. Utilizing the existing manufacturing facilities, for example, at the Heartland Cement Co., Independence, KS, the preferred manufacturing process is to grind in a ball mill a mixture of approximately 90% expansive clinker and 10% $C\bar{S}$ to a fineness of about 6300±200 $cm^2$/gm (as measured by ASTM C206–94). This mixture of ground clinker and gypsum is then dry blended with additional ground gypsum so the mixture becomes 45% clinker and 55% gypsum. This mixture is expansive component. A mixture of about 4% to 35% of expansive component is blended with ordinary portland cement to make shrinkage-compensating cement. The improved expansive concrete clinker used (in percent by weight) is about 20 to 60% $C_4A_3\bar{S}$, 45–55% $C_2S$, 0–8% $C\bar{S}$, 0–3% $C_3A$, 0–3% $C_3S$ and 1–5% F. Of course, higher percentages of $C_4A_3\bar{S}$ may be used (up to 100%), resulting in decreased amounts of expansive component needed for the same amount of expansion. Integral methods using a combined Portland cement/expansive cement clinker may also be used.

The invention is also directed to a method of making an expansive cement comprising grinding a mixture of about 0–20% rock gypsum and 80–100% expansive cement clinker in a ball mill to form a first ground mixture and dry blending or grinding a second mixture including about 40–50% of the first ground mixture and 50–60 dry ground gypsum.

The following examples demonstrate features of the invention.

Comparison Examples

Three concrete mixes were made and length changes were measured by the ASTM C878 method. Except for the cement the mixes were the same.

First Mix (ASTM C806—Prior Art)

The cement used complied with the requirements of ASTM C845. It had an expansion of 0.045 in seven days and an expansion of 0.05 in 28 days, an increase of 111% as measured by ASTM C806.

Second Mix (First form of my invention)

The cement was prepared as described above, with 20% expansive component and the balance Portland cement. The cement had an expansion of 0.08% in 7 days. The 28 day expansion was 0.13%, which is 160% of the 7-day expansion as measured by ASTM 806. At 180 days, the second mix did not shrink below its original length.

Third Mix (Second form of my invention)

The cement was prepared as described above with 5% expansive component and the balance Portland cement. The cement had an expansion of 0.03 in seven days and 0.055 in 28 days, an increase of 183% as measured by ASTM C806. The first mix (ASTM C845) shrank to the original length in 90 days. The third mix did not shrink to the original length for 155 days. The concrete strengths at 28 days and 56 days for both the first and third mixes were the same.

The second and third mixes are the same, except for the amount of expansive component used. The second mix used 20% of expansive component, while the third mix used 5%, the balance in each case being Portland cement.

It is difficult to model the drying shrinkage-compensation of actual in place concrete in the laboratory due to variables in restraint of the concrete, curing conditions, and the eventual drying out of the concrete. SCC in the actual use expands in a range of restraints from complete restraint when the concrete is placed adjacent to a previously placed slab on grade, to no restraint at the free edge of the slab. To study the boundary parameters of my improved shrinkage-compensating cement, I measured the compression exerted when the mortar specimen was completely restrained. (The mortar specimen is the expansive cement and sand mixture. Use of mortar specimens for testing is well known in the industry.) I measured maximum compressive force in the mortar to be 215 psi. The strength gain of the mortar exceeded the compression of the mortar at all times by more than three, i.e., a "safety factor" greater than 3. If at any time the compression due to the expansive forces exceeds the strength of the mortar failure will occur. The cement was measured for expansion using ASTM 806 method both restrained and unrestrained. The restrained expansion was 0.08% in 7 days and 0.13% in 28 days, an increase of 160%. The unrestrained expansion was 0.4% at 5 days after which there was not further expansion.

A third form of my invention relates to blending of the expansive clinker, gypsum and portland cement. The blending of these components can be done by three methods.

Method No. 1

Intergrinding of the portland clinker, expansive clinker, and gypsum in a ball mill at the cement plant. As described in my U.S. Pat. No. 4,419,136, (incorporated herein by reference) particle size control between the portland clinker and the expansive clinker is sacrificed when the grinding and blending is done in the ball mill. This results in a less efficient use of the expansive clinker and less control of the expansive characteristics. However, I have now discovered that in making cement for SCC for seven day expansion of less than 0.04%, if the grinding of the mixture (of Portland clinker, expansive clinker and gypsum) is kept in the range of 4500±200 Blaine No., the uniformity of expansion is good and there is not excessive water demand, which occurs with mixtures having an expansion of about 0.04% and above. The mixture comprises about 3% expansive clinker, 7% gypsum and 90% portland clinker. This new method is advantageous as intergrinding in a ball mill is simplest and least costly. When expansion of greater than 0.04% in 7 days are achieved, control of the particle size is lost and excessive water demand occurs due to the over grinding of the expansive clinker.

Method No. 2

The dry blending of the ground portland clinker, expansive clinker, and gypsum in a mechanical blender. When the hauling distance from the cement manufacturing plant to the construction site is less than about 200 miles, the economics of this method are better than intergrinding when expansion of greater than 0.04% in seven days are required. This method is described in my U.S. Pat. No. 4,419,136.

Method No. 3

In a third method of my invention, for a cement with a 7-day expansion of from about 0.04% to 0.10%, the expansive cement component is wet blended with Portland cement and with the concrete constituents, and water, in the ready-mix or concrete delivery truck. The expansive cement component is only e.g. 10–20% of the entire cement (the other 80–90% being Portland cement which is available locally).

This new method has several advantages. For construction sites greater than 200 miles from the manufacturer of the expansive clinker, transportation costs are substantially reduced. Using wet blending, the expansive component, a mixture of about 45% ground expansive clinker and 55% ground gypsum, is wet blended with portland cement in the proportions of preferably about 12% expansive component with 88% portland cement. Portland cement is widely available. By using the local portland cement and shipping only about 12% of the expansive component, considerable savings are realized in freight costs and storage facilities over shipping the complete cement. This method also allows larger, more efficient production runs at one manufacturing plant. In addition, the intermediate step of separately blending the expansive cement component and the Portland cement is eliminated.

A further advantage of my new expansive component—wet blending method is that the amount of expansion in the concrete can be varied by adjusting the ratio of expansive component to the portland cement. If necessary, this adjustment can be made from concrete batch to batch. It is desirable to vary the concrete expansion to meet exact construction needs and minimize concrete cracking. In some geographical areas the aggregates for concrete have higher shrinkage than other areas. Often higher shrinkage aggregates are less costly than low shrinkage aggregates. By increasing the concrete expansion one can economically compensate for the aggregate shrinkage. Sometimes a construction requires a more fluid mix with a greater amount of water in the mix to make placement of the concrete practical for example in pouring walls or columns having large amounts of reinforcing steel. The shrinkage of concrete is proportional to the amount of mixing water in the mix. One can compensate for the shrinkage due to the additional water by increasing the expansive to portland cement ratio.

With both the interground cement and the dry blended cement the entire cement content of the concrete must be increased to increase the shrinkage compensation or make a concrete which has a high expansive factor because the proportion of expansive component is fixed during the cement manufacturing process. For work requiring lower expansion, this additional expansive component is wasted. The expansive component is more costly than Portland cement, so that economic construction requires no excess or wasted use of expansive component. My wet blending method allows such waste to be eliminated by wet blending in the right amount of expansive component, by batch load, at the ready-mix facility.

Using ordinary concrete mixing and batching procedures often results in the formation of discreet clumps of damp cement balls in the mix which are not broken up in the mixing process. These mud balls are not uncommon in making portland cement concrete and cause only minor problems. However, when an expansive component is added to the mix, and expansive component balls are formed in the concrete mix, disruptions can occur in the concrete during curing due to excessive expansion of the balls. Commonly the balls expand sufficiently to cause "blow ups" or pop outs in the concrete surface. In some cases, the concrete must be removed and replaced. I have discovered that by following a carefully prescribed batching and mixing procedure, the balling is eliminated and a uniform concrete mix is obtained.

Batching and Mixing Procedure

My preferred batching and mixing procedure is
1. Verify removal of wash water is out of the mixing drum by back spinning the mixer drum prior to loading.
2. Charge the mixer with 80% of mixing water.
3. With the mixer drum turning at charging speed, add the coarse aggregate.
4. Weigh the expansive component prior to weighing the portland cement. Add all cementitious material to the mix with the drum turning.
5. Add the fine aggregate and the remaining water.
6. Mix for 70 revolutions at 8 to 12 RPM.
7. Transit to the job site at agitating speed of 2 to 4 RPM.
8. Upon arrival at the jobsite, mix for an additional 20 revolutions at 8 to 12 RPM.
9. Check the slump of the mix. It should be a slump of 5" (plus/minus 1").

Thus, a novel cement, concrete, and methods have been described. Of course, various modifications may be made in the materials, proportions, ranges, and method steps, without departing from the spirit and scope of the invention. The invention, therefore, should not be restricted, except as described in the following claims.

What is claimed is:

1. A shrinkage-compensating concrete having a seven day expansion and a 28 day expansion, comprising Portland cement, and an expansive component wherein the concrete has a 28 day expansion greater than 1150% of the seven day expansion, as measured by ASTM C878 wet cure method for 28 days.

2. A shrinkage-compensating cement having a seven day expansion and a 28 day expansion, comprising Portland cement, and an expansive component wherein the cement has a 28 day expansion greater than 115% of the 7 day expansion as measured by ASTM C806 and wherein the expansive component is ground to about 6300 $cm^2/gm$.

3. A shrinkage-compensating concrete having a seven day expansion and a 28 day expansion comprising Portland cement, and an expansive component wherein the concrete has a seven day expansion less than 0.04%, as measured by ASTM C878 wet cure method for 28 days.

4. The concrete of claim 3 wherein the 28 day expansion is from 120%–200% of the 7-day expansion as measured by ASTM C878 wet cure method for 28 days.

5. A shrinkage-compensating concrete having a seven day expansion and a 28 day expansion and including an expansive component and Portland cement, comprising:
an expansive cement having a 28 day expansion greater than 115% of the seven day expansion as measured by ASTM C806, the expansive component comprising 30 to 60% clinker and 40 to 70% gypsum, and the expansive cement comprised of 5% to 35% expansive component and 65 to 95% Portland cement, aggregate, and water.

6. A method of forming an expansive cement with a 7 day expansion of less than 0.04% and a 28 day expansion of more than 115% of the 7 day expansion by intergrinding an expansive clinker with gypsum and Portland clinker in a ball mill and wherein the expansive clinker, gypsum, and Portland cement have a fineness of 4500 $cm^2/gm$.

7. A method of forming an expansive concrete wherein the concrete is formed by a batching and mixing procedure when the concrete is wet, comprising the steps of wet blending an expansive cement component with ordinary Portland cement during the batching and mixing of the wet concrete wherein the batching and mixing of the wet concrete is comprised of:
charging the mixer with about 80% of mixing water, adding coarse aggregate, and then adding Portland cement and expansive cement component and then,
adding fine aggregate and additional water.

8. A method of forming an expansive concrete wherein the concrete is formed by a batching and mixing procedure when the concrete is wet, comprising the steps of wet blending a ground expansive clinker with ground gypsum and ordinary Portland cement during the batching and mixing of the wet concrete wherein the ground expansive clinker, ground gypsum and Portland cement form an expansive cement having a 7-day expansion of from about 0.40% to 0.10% as measured by ASTM C806, and a 28-day expansion exceeding 115% of the 7-day expansion as measured by ASTM C806.

9. A method of making an expansive cement comprising the steps of:
grinding a mixture of about 0–20% rock gypsum and 80–100% expansive cement clinker in a ball mill to form a first ground mixture; and
dry blending or grinding a second mixture including about 40–50% of the first ground mixture and 50–60% dry ground gypsum.

10. A method for using an expansive cement in a mortar having a 7 day and a 28 day expansion, comprising the steps of:

pouring the mortar containing the expansive cement so that it fills a preset dimension;

allowing the expansive cement to hydrate and gain tensile strength over time wherein the hydration of the expansive cement results in expansion of the mortar.

from its original preset dimension over time, to compensate for shrinkage resulting from drying with the expansion of the mortar at 28 days exceeding 115% of the expansion of the mortar at 7 days as measured by ASTM C806.

11. The concrete of claim 5 wherein after 180 days, the concrete does not shrink below its original length.

12. The concrete of claim 5 wherein the clinker comprises $C_4A_3\overline{S}$.

13. A method for using an expansive cement in a concrete having a 7 day expansion and a 28 day expansion, comprising the steps:

pouring the concrete containing the expansive cement so that it fills a preset dimension;

allowing the expansive cement to hydrate, and gain tensile strength over time wherein the hydration of the expansive cement results in an expansion of the concrete from its original preset dimension over time, to compensate for shrinkage resulting from drying, with the expansion of the concrete at 28 days exceeding 115% of the expansion of the concrete at 7 days as measured by ASTM C878 wet cure method for 28 days.

14. The method of claim 7 further comprising an additional step before the batching and mixing step wherein the additional step is comprised of grinding a mixture of approximately 90% expansive clinker and 10% gypsum to a fineness of about 6300 $cm^2/gm$, and then dry blending with additional ground gypsum, to form a second mixture of about 45% inker and 55% gypsum.

15. The method of claim 9 wherein the first ground mixture is ground to a fineness of about 6300 ±200 $cm^2/gm$.

16. A shrinkage-compensating concrete having a seven-day expansion and a 28 day expansion comprising Portland cement, and an expansive component wherein the concrete has an expansive component having a seven day expansion less than 0.04% and a 28 day expansion about 120 to 200% of the seven day expansion as measured by ASTM C878 wet cure method for 28 days, the expansive component comprising 30 to 60% clinker and the balance being gypsum, and the shrinkage-compensating concrete comprised of about 4% to 35% expansive component and the balance being Portland cement.

17. A shrinkage-compensating cement having a seven day expansion and a 28 day expansion, comprising Portland cement, and an expansive component wherein the cement has a 28 day expansion of 160% of the seven day expansion as measured by ASTM C806.

18. The cement of claim 17 wherein the 7 day expansion is 0.08%.

19. A shrinkage-compensating cement having a seven day expansion and a 28 day expansion comprising Portland cement, and an expansive component wherein the cement has a 28 day expansion of 183% of the 7 day expansion.

20. The cement of claim 19 wherein the 7 day expansion is 0.03%.

21. A shrinkage-compensating cement having a seven day expansion and a 28 day expansion comprising Portland cement and an expansive component wherein the cement has a 7 day expansion of about 0.02–0.04% and a 28 day expansion of about 120–200% of the 7 day expansion as measured by ASTM C806 and wherein the expansive component is ground to about 4500 $cm^2/gm$.

22. A shrinkage-compensating cement having a seven day expansion and a 28 day expansion comprising Portland cement, and an expansive component wherein the cement has a seven day expansion less than 0.04%, as measured by ASTM C806.

23. The cement of claim 22 wherein the 28 day expansion is from 120%–200% of the 7 day expansion as measured by ASTM C806.

24. The concrete of claim 8 wherein the clinker and gypsum forms 10–20% of the entire cement, with the balance being Portland cement.

25. A method of wet blending expansive concrete and for using the expansive concrete in a construction, with the expansive concrete including an expansive component, Portland cement, and other components, comprising the steps of:

separately shipping the expansive component to a mixing site apart from the other concrete components; and adjusting the ratio of expansive component to Portland cement, to adjust the amount of expansion of the expansive concrete, to compensate for anticipated shrinkage of the expansive concrete, after the expansive concrete is placed in a construction.

26. The method of claim 25 wherein the expansive concrete undergoes shrinkage due to mixing water, comprising the additional step of:

adjusting the expansive component to Portland cement ratio to compensate for the shrinkage due to mixing water.

27. The method of claim 25 wherein one of the other components is aggregate comprising the additional step of:

is adjusting the expansive component to Portland cement ratio to compensate for aggregate shrinkage.

28. A method of forming an expansive concrete including gypsum and clinker, by a batching and mixing procedure when the concrete is wet comprising the steps of:

dry blending gypsum and clinker to form an expansive component; and wet blending the expansive component with ordinary Portland cement during the batching and mixing of the concrete.

* * * * *